US012566946B2

(12) United States Patent
Zhang et al.

(10) Patent No.: US 12,566,946 B2
(45) Date of Patent: Mar. 3, 2026

(54) SPARSE CONVOLUTIONAL NEURAL NETWORK

(71) Applicant: Microsoft Technology Licensing, LLC, Redmond, WA (US)

(72) Inventors: Chen Zhang, Beijing (CN); Yunxin Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1130 days.

(21) Appl. No.: 17/615,077

(22) PCT Filed: Apr. 29, 2020

(86) PCT No.: PCT/US2020/030327
§ 371 (c)(1),
(2) Date: Nov. 29, 2021

(87) PCT Pub. No.: WO2020/256836
PCT Pub. Date: Dec. 24, 2020

(65) Prior Publication Data
US 2022/0245433 A1      Aug. 4, 2022

(30) Foreign Application Priority Data

Jun. 18, 2019    (CN) .......................... 201910527910.8

(51) Int. Cl.
G06N 3/048       (2023.01)
G06F 5/01        (2006.01)
(Continued)
(52) U.S. Cl.
CPC .............. G06N 3/048 (2023.01); G06F 5/01 (2013.01); G06F 17/15 (2013.01); G06N 3/0495 (2023.01)

(58) Field of Classification Search
CPC ...... G06N 3/0464; G06N 3/048; G06N 3/082; G06N 3/10; G06F 5/01; G06F 17/15; G06F 17/153
See application file for complete search history.

(56) References Cited

U.S. PATENT DOCUMENTS 10,332,001 B2 *   6/2019   Rippel ................. G06N 3/0455
10,832,123 B2 *   11/2020   Sun ........................ G06N 3/045
(Continued)

FOREIGN PATENT DOCUMENTS

WO        2018073975 A1     4/2018
WO        2018214913 A1     11/2018

OTHER PUBLICATIONS

CVPR2019, program, main conference, 2019, found at https://cvpr2019.thecvf.com/program/main_conference (Year: 2019).*
(Continued)

*Primary Examiner* — Emily E Larocque
(74) *Attorney, Agent, or Firm* — Schwegman Lundberg & Woessner, P.A.

(57)                ABSTRACT

Various implementations of the subject matter as described herein relate to a sparse convolutional neural network. In some implementations, a computer-implemented method comprises: quantizing an input feature map to obtain a quantized input feature map; determining, based on the quantized input feature map, a sparsity mask for an output feature map through a quantized version of a convolutional neural network, the sparsity mask indicating positions of non-zero entries in the output feature map; and determining, based on the input feature map, the non-zero entries indicated by the sparsity mask in the output feature map through the convolutional neural network.

20 Claims, 6 Drawing Sheets

(51) Int. Cl.
G06F 17/15 (2006.01)
G06N 3/0495 (2023.01)

(56) References Cited

U.S. PATENT DOCUMENTS

2020/0143250 A1\* 5/2020 Lee ........................ G06N 3/082
2022/0245433 A1 8/2022 Zhang et al.

OTHER PUBLICATIONS

Notice of Allowance Received for Chinese Application No. 201910527910.8, mailed on Dec. 11, 2024, 04 pages. (English Translation Provided).

First Office Action Received for Chinese Application No. 201910527910.8, mailed on Jun. 26, 2024, 13 pages. (English Translation Provided).

"Nvidia Turing GPU Architecture", https://images.nvidia.com/aem-dam/en-zz/Solutions/design-visualization/technologies/turing-architecture/NVIDIA-Turing-Architecture-Whitepaper.pdf, May 15, 2021, 86 Pages.

Krizhevsky, et al., "The CIFAR-10 Dataset", https://web.archive.org/web/20090923012829/https://www.cs.toronto.edu/~kriz/cifar.html, Sep. 23, 2009, 4 Pages.

Akhlaghi, et al., "Snapea: Predictive Early Activation for Reducing Computation in Deep Convolutional Neural Networks", In Proceedings of the 45th International Symposium on Computer Architecture (ISCA), Jun. 1, 2018, 12 Pages.

Cao, et al., "SeerNet: Predicting Convolutional Neural Network Feature-Map Sparsity Through Low-Bit Quantization", In Proceedings of the IEEE Conference on Computer Vision and Pattern Recognition, Jun. 15, 2019, pp. 11208-11217.

Dong, et al., "More is less: A More Complicated Network with Less Inference Complexity", In Proceedings of IEEE Conference on Computer Vision and Pattern Recognition (CVPR), Jul. 21, 2017, pp. 1895-1903.

Figurnov, et al., "Spatially Adaptive Computation Time for Residual Networks", In Proceedings of IEEE Conference on Computer Vision and Pattern Recognition, Jul. 21, 2017, pp. 1039-1048.

Graham, et al., "Submanifold Sparse Convolutional Networks", In Repository of arXiv:1706.01307v1, Jun. 5, 2017, 10 Pages.

Han, et al., "Deep Compression: Compressing Deep Neural Networks with Pruning, Trained Quantization and Huffman Coding", In Repository of arXiv:1510.00149v1, Oct. 1, 2015, 11 Pages.

Han, et al., "Learning Both Weights and Connections for Efficient Neural Networks", In Proceedings of Advances in Neural Information Processing Systems, vol. 1, Jun. 8, 2015, 9 Pages.

He, et al., "Deep Residual Learning for Image Recognition", In Proceedings of the IEEE Conference on Computer Vision and Pattern Recognition, Jun. 27, 2016, pp. 770-778.

Iandola, et al., "SqueezeNet: AlexNet-level accuracy with 50x fewer parameters and <0.5 MB model size", In Repository of arXiv:1602.07360v4, Nov. 4, 2016, 13 Pages.

Ioffe, et al., "Batch normalization: Accelerating Deep Network Training by Reducing Internal Covariate Shift", In Repository of arxiv:1502.03167v1, Feb. 11, 2015, 10 Pages.

Jaderberg, et al., "Speeding up Convolutional Neural Networks with Low Rank Expansions", In Repository of arXiv:1405.3866v1 , May 15, 2014, 12 Pages.

Jaderberg, et al., "Speeding up Convolutional Neural Networks with Low Rank Expansions", In Proceedings of British Machine Vision Conference, Sep. 1, 2014, 13 Pages.

Judd, et al., "Cnvlutin2: Ineffectual-Activation-and-Weight-Free Deep Neural Network Computing", In Repository of arXiv:1705.00125v1, Apr. 29, 2017, 6 Pages.

Kong, et al., "RON: Reverse Connection with Objectness Prior Networks for Object Detection", In Proceedings of IEEE Conference on Computer Vision and Pattern Recognition (CVPR), Jul. 21, 2017, pp. 5244-5252.

Krishnamoorthi, Raghuraman, "Quantizing Deep Convolutional Networks for Efficient Inference: A whitepaper", In Repository of arXiv:1806.08342v1 , Jun. 21, 2018, 36 Pages.

Li, et al., "Not All Pixels Are Equal: Difficulty-Aware Semantic Segmentation via Deep Layer Cascade", In Proceedings of IEEE Conference on Computer Vision and Pattern Recognition (CVPR), Jul. 21, 2017, pp. 6459-6468.

Li, et al., "Pruning Filters for Efficient ConvNets", In Repository of arXiv:1608.08710v1, Aug. 31, 2016, 9 Pages.

Liu, et al., "Sparse Convolutional Neural Networks", In Proceedings of IEEE Conference on Computer Vision and Pattern Recognition (CVPR), Jun. 7, 2015, pp. 806-814.

Loannou, et al., "Deep Roots: Improving CNN Efficiency with Hierarchical Filter Groups", In Proceedings of IEEE Conference on Computer Vision and Pattern Recognition (CVPR), Jul. 21, 2017, pp. 5977-5986.

Mcdanel, et al., "Full-Stack Optimization for Accelerating CNNs with FPGA Validation", In Repository of arXiv:1905.00462v1 May 1, 2019, 12 Pages.

Parashar, et al., "SCNN: An Accelerator for Compressed-Sparse Convolutional Neural Networks", In Proceedings of ACM SIGARCH Computer Architecture News vol. 45, Issue 2, Jun. 24, 2017, pp. 27-40.

"International Search Report & Written Opinion issued in PCT Application No. PCT/US20/030327", Mailed Date: Jul. 30, 2020, 13 Pages.

Rastegari, et al., "XNOR-Net: ImageNet Classification Using Binary Convolutional Neural Networks", In Proceedings of European Conference on Computer Vision, 2016, pp. 525-542.

Ren, et al., "SBNet: Sparse Blocks Network for Fast Inference", In Proceedings of IEEE/CVF Conference on Computer Vision and Pattern Recognition, Jun. 18, 2018, pp. 8711-8720.

Russakovsky, et al., "ImageNet Large Scale Visual Recognition Challenge", In International Journal of Computer Vision, vol. 115, No. 3, Apr. 11, 2015, pp. 211-252.

Shi, et al., "PointRCNN: 3D Object Proposal Generation and Detection from Point Cloud", In Repository of arXiv:1812.04244v2, Dec. 11, 2018, 10 Pages.

Shi, et al., "Speeding up Convolutional Neural Networks By Exploiting the Sparsity of Rectifier Units", In Repository of arXiv:1704.07724v1, Apr. 25, 2017, 7 Pages.

Zhou, et al., "Dorefa-net: Training Low Bitwidth Convolutional Neural Networks with Low Bitwidth Gradients", In Repository of arXiv:1606.06160v1, Jun. 20, 2016, 13 Pages.

Simonyan, et al., "Very Deep Convolutional Networks for Large-Scale Image Recognition", In Repository of arxiv:1409.1556v1, Sep. 4, 2014, 10 Pages.

Szegedy, et al., "Going Deeper with Convolutions", In Proceedings of the IEEE conference on computer vision and pattern recognition, Jun. 7, 2015, 9 pages.

Szegedy, et al., "Rethinking the Inception Architecture for Computer Vision", In Proceedings of IEEE Conference on Computer Vision and Pattern Recognition (CVPR), Jun. 27, 2016, pp. 2818-2826.

Vanhoucke, et al., "Improving the Speed of Neural Networks on CPUs", In Proceedings of Deep Learning and Unsupervised Feature Learning Workshop, NIPS, 2011, 8 Pages.

Wen, et al., "Learning Structured Sparsity in Deep Neural Networks", In Proceedings of Advances in Neural Information Processing Systems, Dec. 2016, 9 Pages.

Wu, et al., "3d Shapenets: A Deep Representation for Volumetric Shapes", In Proceedings of IEEE Conference on Computer Vision and Pattern Recognition, Jun. 7, 2015, pp. 1912-1920.

Yan, et al., "SECOND: Sparsely Embedded Convolutional Detection", In Journals of Sensors, vol. 18, Issue 10, Oct. 6, 2018, 17 Pages.

Yao, et al., "Balanced Sparsity for Efficient DNN Inference on GPU", In Repository of arXiv:1811.00206v1, Nov. 1, 2018, 8 Pages.

Zhang, et al., "LQ-Nets: Learned Quantization for Highly Accurate and Compact Deep Neural Networks", In Repository of arXiv:1807.10029v1, Jul. 26, 2018, 21 Pages.

(56)             References Cited

OTHER PUBLICATIONS

Zhu, et al., "Trained Ternary Quantization", In Repository of arXiv:1612.01064v1, Dec. 4, 2016, 9 Pages.
Zhuang, et al., "Towards Effective Low-bitwidth Convolutional Neural Networks", In Proceedings of IEEE/CVF Conference on Computer Vision and Pattern Recognition, Jun. 18, 2018, pp. 7920-7928.

* cited by examiner

300

302

304

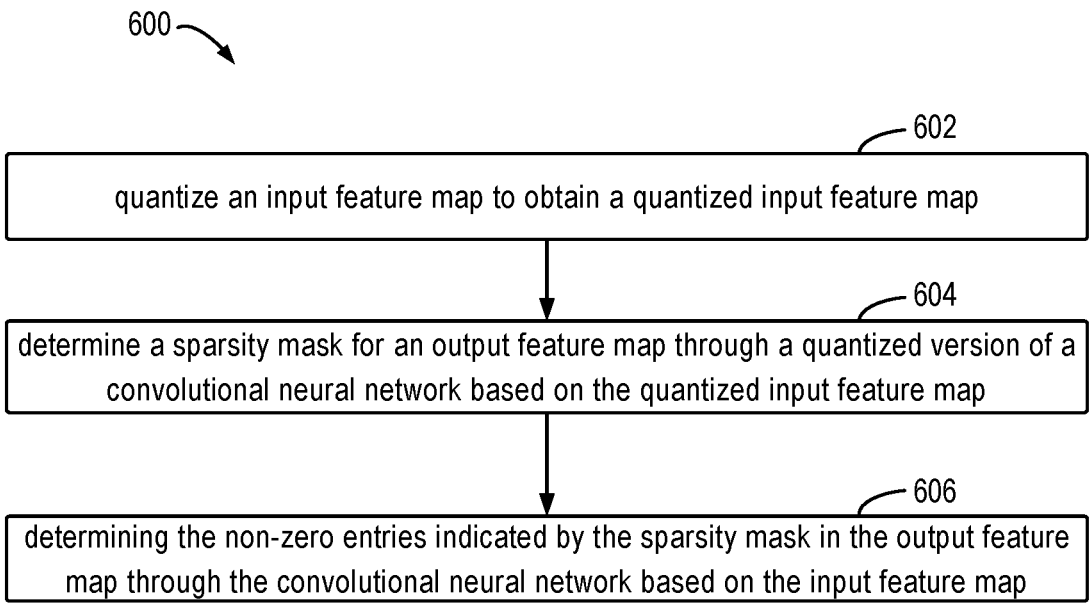

600

602
quantize an input feature map to obtain a quantized input feature map 604
determine a sparsity mask for an output feature map through a quantized version of a convolutional neural network based on the quantized input feature map 606
determining the non-zero entries indicated by the sparsity mask in the output feature map through the convolutional neural network based on the input feature map

FIG. 6

SPARSE CONVOLUTIONAL NEURAL NETWORK

CROSS-REFERENCE TO RELATED APPLICATION

This application is a U.S. National Stage Filing under 35 U.S.C. 371 of International Patent Application Serial No. PCT/US2020/030327, filed Apr. 29, 2020, and published as WO 2020/256836 A1 on Dec. 24, 2020, which claims priority to Chinese Application No. 201910527910.8, filed Jun. 18, 2019, which applications and publication are incorporated herein by reference in their entirety.

BACKGROUND

Nowadays, a lot of major breakthroughs in artificial intelligence come from convolutional neural networks (CNNs) with great depths. Inference on these bulky models often requires a huge amount of computational power and a large amount of power. Therefore, there arises a problem regarding how to run these models in a low-cost and energy-efficient way.

SUMMARY

In accordance with implementations of the subject matter as described herein, there is provided a solution for reducing overhead of a convolutional neural network through quantization and sparse convolution. For example, an input feature may be quantized, to obtain a quantized input feature map. Based on the quantized input feature map, a sparse mask for an output feature map is determined through a quantized version of a convolutional neural network, and the binary sparse mask indicates positions of non-zero entries in the output feature map. Based on the input feature map, non-zero entries indicated by the sparse mask in the output feature map are determined through the convolutional neural network.

The Summary is to introduce a selection of concepts in a simplified form that are further described below in the Detailed Description. This Summary is not intended to identify key features or essential features of the subject matter as described herein, nor is it intended to be used to limit the scope of the subject matter as described herein.

BRIEF DESCRIPTION OF THE DRAWINGS

FIG. 6 illustrates a flowchart of a method for a convolutional neural network in accordance with some implementations of the subject matter.

Throughout the drawings, the same or similar reference symbols refer to the same or similar elements.

DETAILED DESCRIPTION OF EMBODIMENTS

The subject matter as described herein will now be described with reference to several example implementations. It would be appreciated that description of those implementations is merely for the purpose of enabling those skilled in the art to better understand and further implement the subject matter as described herein and is not intended for limiting the scope disclosed herein in any manner.

As used herein, the term "includes" and its variants are to be read as open-ended terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second" or the like may represent different or the same objects. Other definitions, either explicit or implicit, may be included below.

Figure 1:
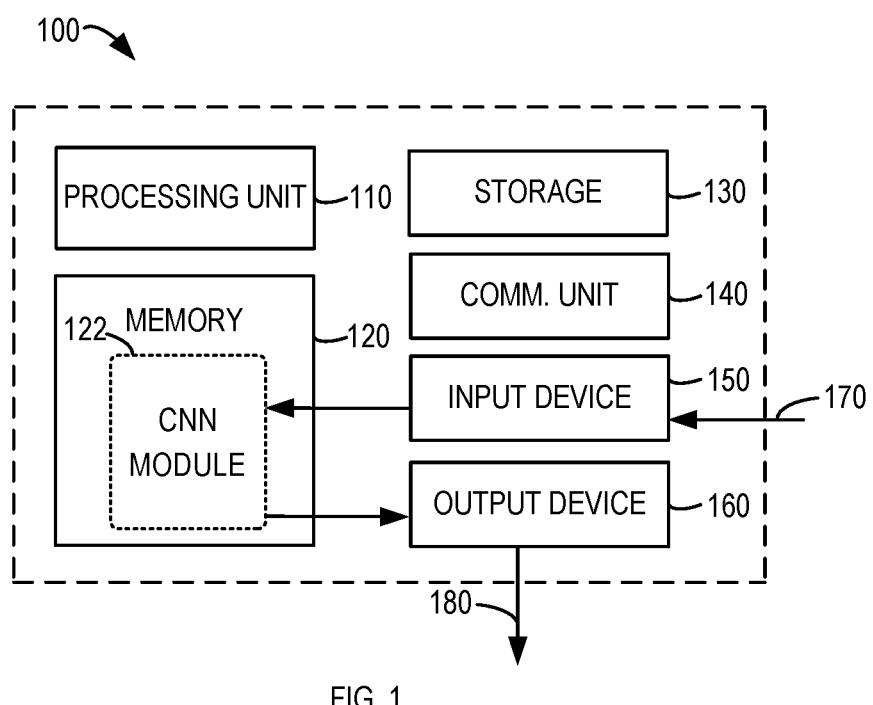
FIG. 1 illustrates a block diagram of a computing device where implementations of the subject matter as described herein can be implemented.

Basic principles and several example implementations of the subject matter described herein will now be described with reference to the drawings. FIG. 1 illustrates a block diagram of a computing device 100 where implementations of the subject matter described herein can be implemented. It would be appreciated that the computing device 100 described in FIG. 1 is merely for illustration and not limit the function and scope of implementations of the subject matter described herein in any manners. As shown in FIG. 1, the computing device 100 includes a computing device 100 in the form of general computer device. Components of the computing device 100 include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals having a computing capability. The service terminal may be a server provided by various server providers, a large-scale computing device, and the like. The user terminal, for example, may be any type of mobile terminal, fixed terminal or portable terminal, such as mobile telephone, station, unit, device, multimedia computer, multimedia tablet, Internet node, communicator, desk-top computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It is appreciated that the computing device 100 can support any type of interface for a user (such as a "wearable" circuit).

The processing unit 110 may be a physical or virtual processor and can execute various processes based on the programs stored in the memory 120. In a multi-processor system, multiple processing units execute computer-executable instructions in parallel to improve the parallel processing capacity of the computing device 100. The processing unit 110 may also be referred to as a central processing unit (CPU), microprocessor, controller or microcontroller.

The computing device 100 typically includes computer storage media, which may be any available media accessible by the computing device 100, including, but not limited to, volatile and non-volatile media, and removable and non-removable media. The memory 120 may be a volatile memory (for example, a register, cache, or Random Access Memory (RAM)), non-volatile memory (for example, a Read-Only Memory (ROM), Electrically Erasable Programmable Read-Only Memory (EEPROM), or flash memory), or any combination thereof. The memory 120 may include a convolutional neural network (CNN) module 122, and theses program modules are configured to perform functionalities of various implementations as described herein. The CNN module 122 may be accessed and run by the processing unit 110 to implement the respective functionalities.

The storage device 130 may be any removable or non-removable medium, and may include machine-readable media which can store information and/or data and accessed within the computing device 100. The computing device/server 100 may further include additional removable/non-removable, volatile/non-volatile memory media. Although not shown in FIG. 1, a disk drive may be provided for reading or writing a removable and non-volatile disk and a disc drive may be provided for reading or writing a removable non-volatile disc. In these cases, each drive may be connected to a bus (not shown) via one or more data medium interfaces.

The communication unit 140 communicates with a further computing device via communication media. In addition, functionalities of components in the computing device 100 may be implemented by a single computing cluster or multiple computing machines connected communicatively for communication. Therefore, the computing device 100 may be operated in a networking environment using a logical link with one or more other servers, network personal computers (PCs) or another general network node.

The input device 150 may include one or more input devices, such as a mouse, keyboard, tracking ball, and the like. The output device 160 may include one or more output devices, such as a display, loudspeaker, printer and the like. As required, the computing device 100 may also communicate via the communication unit 140 with one or more external devices (not shown) such as a storage device, display device and the like, one or more devices that enable users to interact with the computing device 100, or any devices that enable the computing device 100 to communicate with one or more other computing devices (for example, a network card, modem, and the like). Such communication may be performed via an input/output (I/O) interface (not shown).

In some implementations, besides integrated on a single device, some or all components in the computing device 100 may be provided in the form of cloud computing architecture. In the cloud computing architecture, these components may be arranged remotely, and may operate together to implement the functionalities described herein. In some implementations, the cloud computing provides computing, software, data access and storage services, without necessity of letting terminal users know the physical location or configuration of the system or hardware that provides these services. In various implementations, the cloud computing provides services via a wide area network (for example, Internet) using an appropriate protocol. For example, a cloud computing provider provides applications via a wide area network, and they are accessible via a web browser or any other computing component. Software or components and respective data of the cloud computing architecture may be stored on a server at a remote location. Computing resources in a cloud computing environment may be fused at a remote data center location or may be dispersed. Cloud computing infrastructures may provide services through a shared data center even though they are presented as a single access point for users. Hence, the cloud computing architecture may be used to provide components and functionalities as described herein from the service provider at the remote location. Alternatively, they may be provided from regular servers, or they may be mounted on a client device directly or in other manners.

The computing device 100 may be used to implement a solution for a convolutional neural network (CNN) in implementations of the subject matter as described herein. The computing device 100 may receive via the input device 150 input data, such as an image or the like. The CNN module 122 may process the input data, to obtain respective output data, such as image categories or classes. The output data may be provided to the output device 160 and further to a user as an output 180. For example, image categories (for example, dog, cat, and the like) may be displayed on a display, to be presented to a user.

Exploring sparsity in CNNs is a key technique to reduce model-inference cost. Many CNNs have many values involved in the calculation being zero or close to zero. By skipping the zero values, model-inference cost or overhead could be significantly reduced. Sparsity arises in a neural network typically in three aspects of weights, input and output. The focus of attention will be given herein to sparsity prediction of output.

In accordance with implementations of the subject matter as described herein, a highly quantized (for example, less than 4-bit) version of the original CNN network to predict a sparsity mask (for example, a binary sparsity mask) of the output feature maps, which indicates non-zero positions in the output feature map. Then, the binary sparsity mask may be used to guide the full precision convolution, for example, to compute the values of the respective non-zero entries only, in no need of computing the zero entries. Since the original network is quantized, the method does not require pre-training or external knowledge.

In some implementations, quantized prediction can predict output sparsity accurately while incurring little computation overhead. In addition, full precision sparse convolution is able to efficiently utilize this sparsity to speed up inference, which may be implemented by adapting a hardware platform to sparse convolutions.

Figure 2:
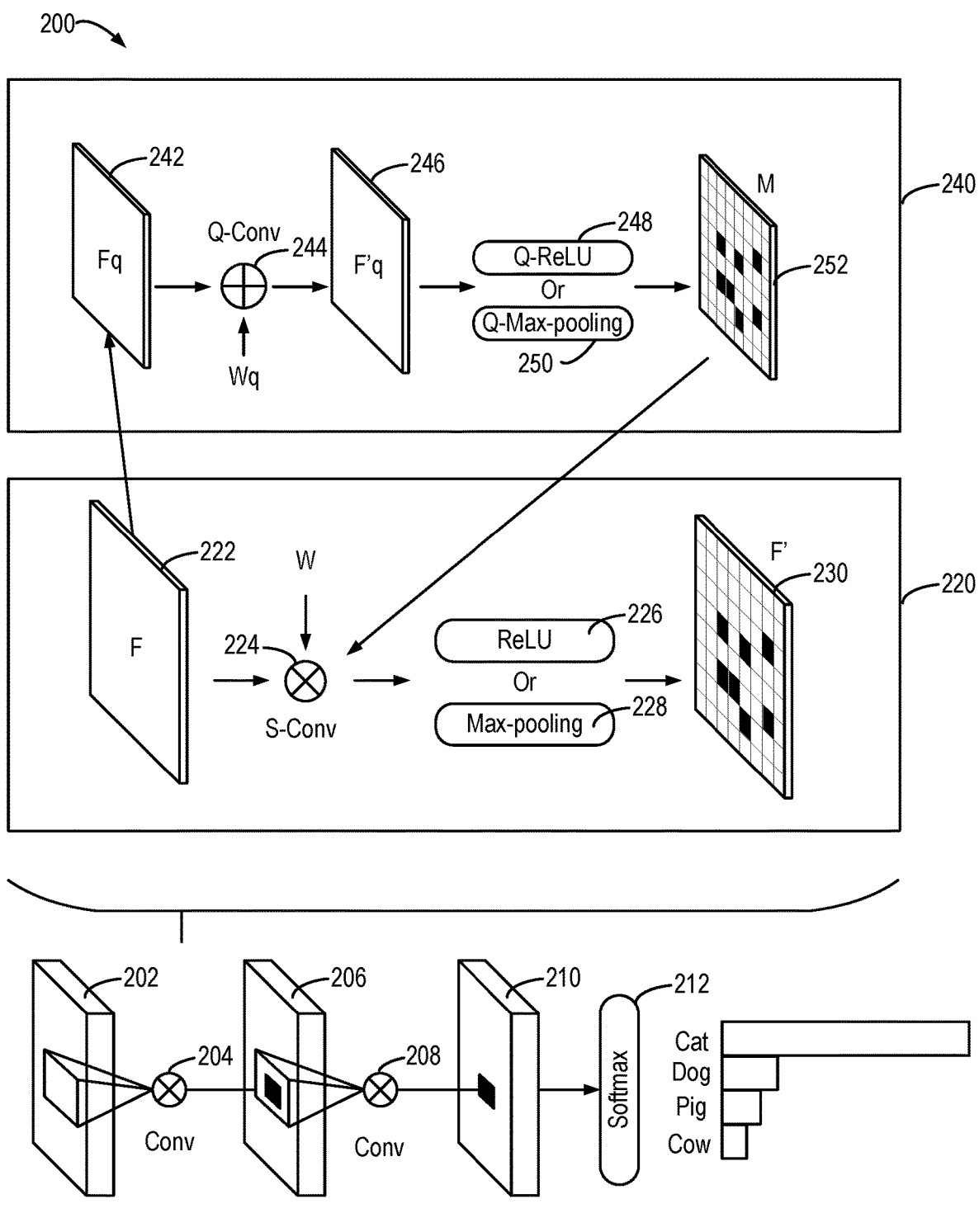
FIG. 2 illustrates a schematic diagram of architecture of a convolutional neural network in accordance with some implementations of the subject matter as described herein.

FIG. 2 illustrates a schematic diagram of architecture 200 of a convolutional neural network in accordance with some implementations of the subject matter as described herein. In the architecture 200, an input image (for example, an image of cat) is transformed into an input feature map 202. The input feature map 202 generates a feature map 206 via a convolution layer 204, as an output feature map of this layer. The feature map 206 is provided to a next convolution layer 208, to generate a feature map 210 as an output feature map of this layer. The feature map 210 is provided to a Softmax layer 212, to provide a categorized result of the convolutional neural network. As shown in FIG. 2, "cat" has the highest probability, i.e., the input image is categorized as "cat." The application of the convolutional neural network has been described above in combination with the categorization application. However, it would be appreciated that the implementations in accordance with the subject matter as described herein may be applied to any other suitable type of application.

The sparsity prediction module 220 shows a sparsity implementation of a convolutional layer 204 in accordance with some implementations of the subject matter as described herein. It would be appreciated that the sparsity prediction module 220 may be applied to any other suitable convolution layer. In the implementation, an input feature map (F) 222 may be an input feature map 202, which may be provided together with a weight (W) to a sparse convolution layer (S-Conv) 224. The sparse convolution layer 224 also receives from a prediction module 240 a sparsity mask (M) 252 which represents sparsity of the output feature map 230 of the convolution layer. In other words, if the sparsity mask 252 indicates that the respective output in the output feature map (F') 230 is zero, it is unnecessary to compute the respective output value. The output of the sparse convolution layer 224 is provided to an activation function, for example, a linear rectification function (ReLU) layer 226 or a maximum pooling (max-pooling) layer 228. The output of the activation function is the output feature map 230 which corresponds to the feature map 206 in this implementation.

The prediction module 240 shows a method of determining a sparsity mask in accordance with some implementations in the subject matter as described herein, which is a quantized version of the convolution layer 204. The input feature map 222 is quantized as a quantized input feature map (Fq) 242. The quantized input feature map 242 is provided to a quantized version of the convolutional neural network. For example, the quantized input feature map 242 is provided to a quantized convolution layer (Q-Conv) 244. The quantized input feature map 242 and the quantized weights Wq perform a convolution operation, to obtain the quantized output feature map (F'q) 246. The quantized output feature map 246 is provided to the quantized activation function, for example, the quantized ReLU (Q-ReLU) layer 248 or the quantized maximum pooling (Q-max-pooling) layer 250. The output of the activation function is a sparsity mask 252, to be provided to the sparse convolution layer 224 in the module 220.

Figure 3:
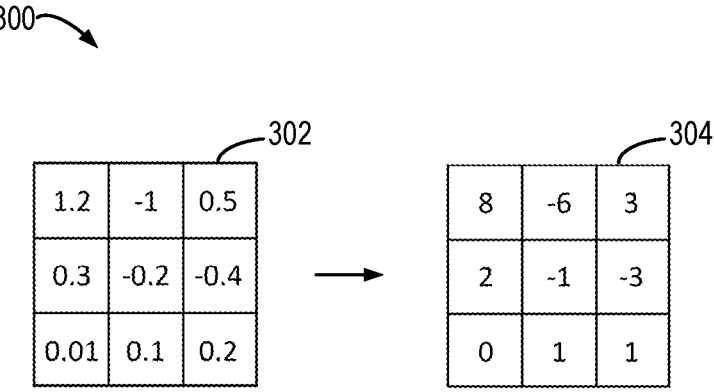
FIG. 3 illustrates a schematic diagram of a quantization operation in accordance with some implementations of the subject matter as described herein.

FIG. 3 illustrates a schematic diagram of a quantization operation 300 in accordance with some implementations of the subject matter as described herein. In the quantization operation 300, a maximum absolute value M in a feature map (or a tensor) 302 may be first determined, and then an x value may be mapped through an equation $$x' = \left\lfloor \frac{x}{M / 2^{\wedge}(n-1)} \right\rfloor$$

to x', where n represents a bit number of a quantized operation, and $\lfloor \bullet \rfloor$ represents rounding down. In this way, a quantized version of the feature map 302, i.e., a feature map 304, may be obtained.

In FIG. 3, the feature map 302 may be the input feature map 222 as shown in FIG. 2, and the feature map 304 may be the input feature map 242 as shown in FIG. 2. In the example, a 3×3 tensor is 4-bit quantized. It would be appreciated that any other quantization of more or fewer bits may be used. In some implementations, quantization of no more than 4 bits (for example, 4 bits or 1 bit) may be employed, which is significantly less than bits (often more than 8 bits) of a typical quantization operation.

In FIG. 3, a maximum absolute value of a tensor may be determined first, which is "1.2" in this example. Then, a linear mapping function may be defined to map the maximum value to a maximum integer representation, i.e., $2^{4-1}-1=7$. Therefore, any number between −1.2 and 1.2 is mapped to −8 to 7 by the mapping function as described above.

The quantization operation has been introduced above in combination with a specific quantization method, but it would be appreciated that any other appropriate quantization method may be employed. Quantization is a common method for accelerating inference and training of a neural network. Different from classical quantization, quantization is not used herein for full inference but only employed layer by layer to predict sparsity of an output feature map. Therefore, as compared with the quantization solution implementing the entire classification, much lower bits in the quantization operation may be utilized.

For a ReLU activation function, the prediction module 240 may determine a sign of a respective element in the output feature map, and set the negative values to zero. For Max-pooling, the prediction module 240 may determine a position of a maximum value in each sub-region, regardless of the exact value. Lower quantization bits often mean lower computational overhead and faster inference speed. In contrast, over quantization introduces too much prediction errors and will degrade categorization accuracy. The best quantization level may be determined empirically, or the lowest quantization level may be determined through experiments. For example, through experiments, it is found that the top-1 accuracy can be achieved with 4-bit quantization.

The quantized convolution layer 224 (also referred to as quantized convolution operation Q-Conv) as shown in FIG. 2 will be described below in detail. Different from the traditional method, the quantization convolution operation Q-Conv does not require a de-quantization stage to recover the accuracy and thus needs fewer operations and runs faster.

Equation (1) denotes a classical convolution operation:

$$Y = \sum_{i}^{N} W_i \otimes X_i \tag{1}$$

where $\otimes$ denotes a convolution operation, W denotes weights of the convolution operation, X denotes input data of the convolution operation, Y denotes output data of the convolution operation, and N denotes the data dimension. For the sake of simplicity, only weights are considered herein, without biases. Given a quantizer f, a quantized convolution operation is shown in equation (2):

$$f(Y) = f\left( \sum_{i}^{N} W_i \otimes X_i \right) \tag{2}$$
$$= \sum_{i}^{N} f(W_i \otimes X_i)$$
$$= \sum_{i}^{N} f_{w \times w}^{-1}(f_w(W_i) \oplus f_x(X_i))$$

where $\oplus$ denotes an integer convolution operation, f denotes a quantization function, and $f^{-1}$ denotes an inverse function of the quantization function.

Different than the classical quantized convolution, the Q-Conv is dequantization-free because: for ReLU, the prediction module 240 only considers the sign for each element, and for Max-pooling, the prediction module 240 only considers the position of the maximum value of each sub-region.

Thus, the computation formula is shown as equation (3) below. It is seen that the Q-Conv operation does not require dequantization:

$$\text{sign}(f(Y)) = \text{sign}\left(\sum_i^N f_{w \times w}^{-1}(f_w(W_i) \oplus f_x(X_i))\right)$$

$$= \text{sign}\left(\sum_i^N f_w(W_i) \oplus f_x(X_i)\right) \quad (3)$$

In a lot of common CNN models, the convolution layer is often followed by a batch-normalization (BN) layer and/or ReLU layer and/or Max-pooling layer. Different models have different combinations of these layers, depending on how these models are designed and tuned. For sparsity mask-based prediction, these combinations may be divided into two groups.

1) Convolution+ReLU and/or Max-Pooling

As discussed above, the Q-Conv outputs low-bit integer numbers. When a ReLU layer follows a convolution layer, a quantized ReLU operation (Q-ReLU) may be applied on the output of Q-Conv. Q-ReLU only considers the signs of Q-Conv's output feature maps and thereby generates a corresponding sparsity mask with the same dimension. Similarly, Q-Max-pooling only considers the position of the maximum value in each sub-region and generates a corresponding sparsity mask.

Figure 4:
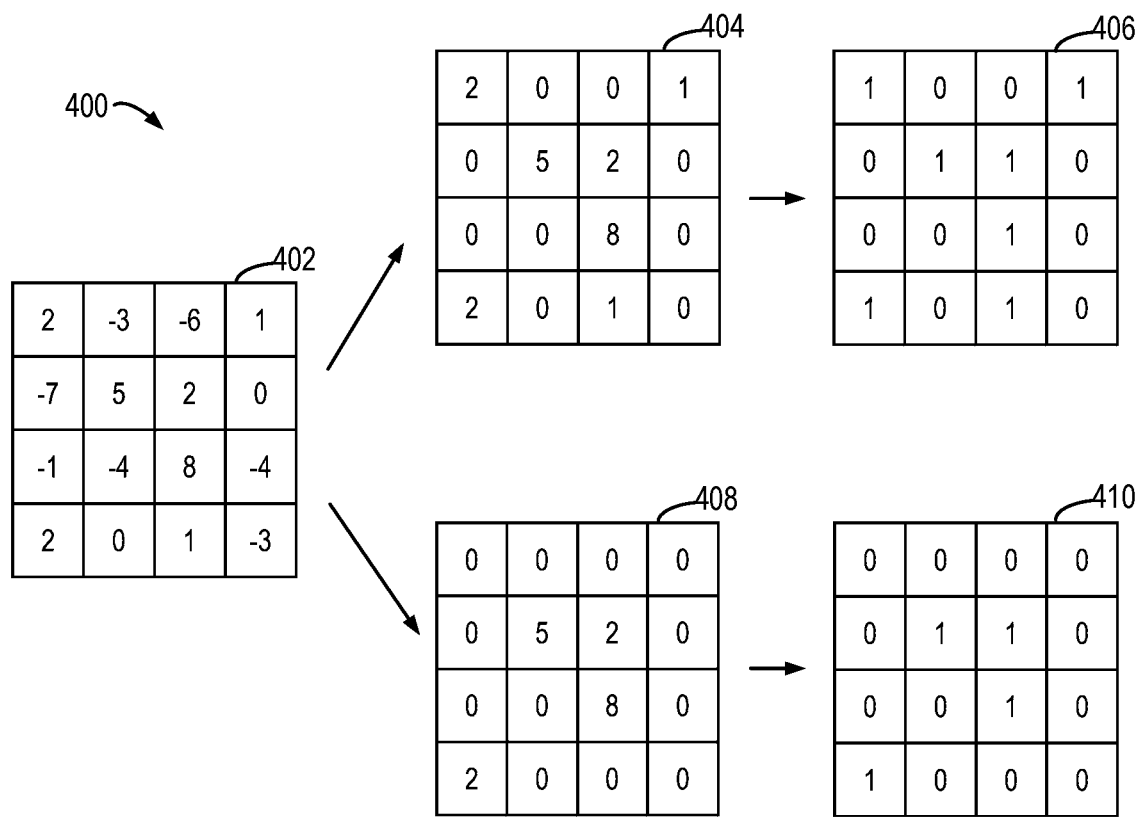
FIG. 4 illustrates a schematic diagram of a method of determining a sparsity mask in accordance with some implementations of the subject matter as described herein.

FIG. 4 illustrates a schematic diagram of a method 400 of determining a sparsity mask in accordance with some implementations of the subject matter as described herein. For example, the method 400 may be used to implement the quantized convolution layer 224 as shown in FIG. 2. As shown in FIG. 4, the output feature map 402 of Q-Conv is transformed through a Q-ReLU operation into a feature map 404, and further into a sparsity mask 406. Likewise, the output feature map 402 of Q-Conv is transformed through a Q-Max-pooling operation (2×2) into a feature map 408, and then into a sparsity mask 410.

2) Convolution+Batch Normalization+ReLU/Max-Pooling

In some implementations, batch normalization which is common in CNN models can be applied to reduce a co-variant shift within feature maps. Different from the ReLU and Max-pooling layers, a batch normalization layer has four parameters, including a scaling factor $\alpha$, a bias $\beta$, an average mean $\mu$, and an average variance $\sigma^2$, as shown in the equation (4).

As shown in the equation (5), there are two parameters to be quantized, namely convolution weights $W_i$ and a batch normalization scaling factor $\alpha_j$. Directly applying quantized batch-normalization (Q-BN) on the output of Q-Conv will result in the product of two quantized parameters. This will amplify the quantization error and produce extra errors in sparsity prediction.

In accordance with implementations of the subject matter as described herein, the quantization errors may be removed by fusing a Q-Conv kernel and a Q-BN kernel. Kernel fusion is a common practice for accelerating deep neural network (DNN) models. Here, the convolution and the batch normalization are fused to remove the compound quantization errors. The equation (6) shows deduction of a fused operation, where $\alpha_j$ and $W_i$ are fused as $f(\alpha_j \times W_i)$, and the fused Q-Conv and Q-BN operation is referred to as Q-Conv-BN.

$$B_j = \frac{\alpha_j \times (Y_i - \mu)}{\sqrt{\sigma^2 + \varepsilon}} + \beta \quad (4)$$

-continued $$B_j = \frac{\alpha_j \times \left(\sum_i^N W_i \otimes X_i + \text{bias} - \mu\right)}{\sqrt{\sigma^2 + \varepsilon}} + \beta \quad (5)$$

$$f(B_j) = f\left(\frac{\sum_i^N \alpha_j W_i \otimes X_i + \alpha \times (\text{bias} - \mu)}{\sqrt{\sigma^2 + \varepsilon}} + \beta\right) \quad (6)$$

$$= \frac{f\left(\sum_i^N \alpha_j W_i \otimes X_i\right) + f(\alpha \times (\text{bias} - \mu))}{f\left(\sqrt{\sigma^2 + \varepsilon}\right)} + f(\beta)$$

$$= \frac{\sum_i^N f_w(\alpha_j W_i) \oplus f_x(X_i) + f(\alpha \times (\text{bias} - \mu))}{f\left(\sqrt{\sigma^2 + \varepsilon}\right)} + f(\beta)$$

As shown in the equation (6), quantization performed after kernel fusion may avoid compound quantization errors. In this way, the solution can avoid losing accuracy when reducing the computational overheads of the prediction module 240.

How sparsity of a feature map is utilized to save computational overheads has been introduced above in combination with a convolutional neural network. Theoretically, given a ReLU layer with 80% sparsity, the upper bound speedup is 5× by skipping 80% computation. For Max-pooling layers, a 2×2 Max-pooling can save three quarters computation, which means theoretically a 4× speedup. However, in practice, due to the quantization prediction costs and sparsity computational overheads, how to turn the sparsity of feature maps into speedup on real hardware platforms still needs to be further considered.

In accordance with some implementations of the subject matter as described herein, the method of sparsity prediction and sparse convolution may be accelerated on commodity hardware or universal hardware. Current commodity central processing units (CPUs) do not have native low-bit arithmetic hardware support. Hence, a vector processing unit of a CPU (for example, advanced vector extensions (AVX)) may be used to perform quantized prediction. For example, some CPUs which do not have native support for 4-bit data may use 8-bit integers for arithmetic computation even if a lower bit precision (for example, 4 bits) may be used for the prediction network. In the implementation using 4-bit quantization, a 4-bit format may be used to cache intermediate results, for efficient storage.

Figure 5:
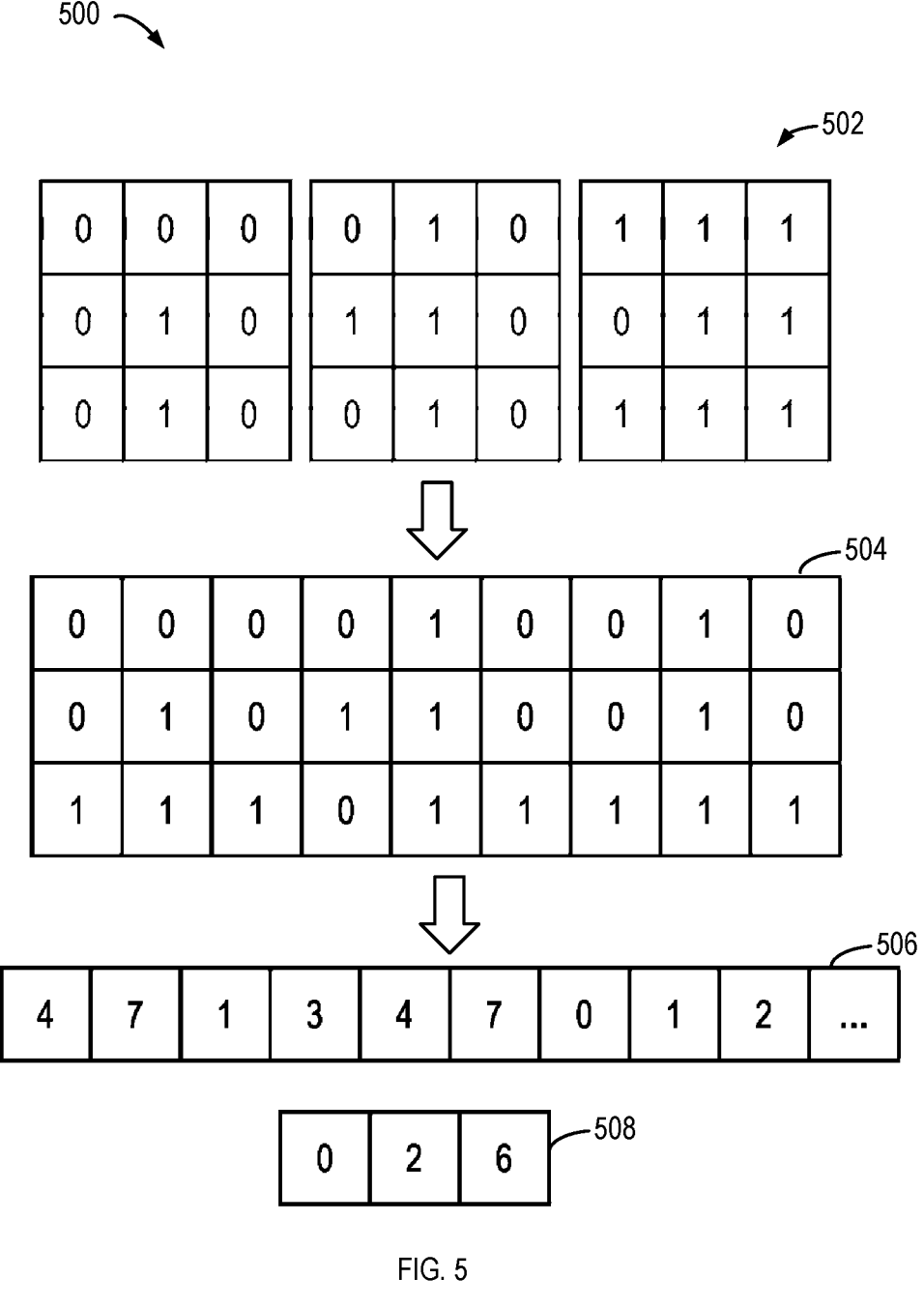
FIG. 5 illustrates a schematic diagram of an encoding method in accordance with some implementations of the subject matter.

FIG. 5 illustrates a schematic diagram of an encoding method 500 in accordance with some implementations of the subject matter as described herein. As shown in FIG. 5, a sparsity mask 502 includes three layers, each of which corresponds to a respective layer or slice of the output feature map. The sparsity mask 502 may be vectorized as a vector 504, in which each row represents a respective slice of the sparsity mask 502. The vector 504 may be encoded by recording the positions of non-zero entries therein. For example, a column index 506 represents a column index of each non-zero entry, and a row index 508 represents a row index of a first non-zero entry in each row of non-zero entries.

The sparsity encoding format in accordance with implementations of the subject matter as described herein may increase the computation efficiency of sparse convolution. Specifically, a sparse convolution (S-Cony) kernel may discard indices of all of the zero outputs and thus only take non-zero entries. In addition, matrix indices may be directly encoded so that S-Cony can retrieve indices and an input vector with negligible overhead.

The two models, namely the prediction model and the sparse convolution model, introduce duplicated storage for quantized parameters and feature maps. The additional storage overhead leads to wasteful memory access and therefore downgrades performance. In accordance with some implementations of the subject matter as described herein, a multi-level data reuse technique may be utilized to solve the problem. To increase data reuse, execution of input quantization and Q-Conv, Q-BN, Q-ReLU and Q-Maxpooling are fused to fully reuse data in CPU registers. In some implementations, S-Cony may be fused with S-BN, S-ReLU, or S-Max-pooling to reuse temporary data in the register and/or the CPU cache.

In some implementations, since Q-Conv is packed in an AVX vector format, an in-register arithmetic shift may be used to transform the data format between AVX and other kernels.

In accordance with some implementations of the subject matter as described herein, dedicated hardware can take full advantage of quantization and sparse convolution. For example, mixed precision hardware may be a Graphics Processing Unit (GPU) and/or Field Programmable Gate Array (FPGA). For example, in a GPU, a mixed precision tensor core can further decrease quantized prediction overhead, and massive parallel processing units can accelerate a sparse convolution operation.

Reconfigurable Look-Up-Tables (LUTs) of an FPGA can provide circuit level bit-manipulation, and thus are very suitable to conduct low-bit quantized prediction and to achieve extremely high performance. Digital Signal Processor (DSP) units of the FPGA can carry fast sparse convolution. High flexibility of the FPGA also enables more room of multi-level optimization, such as fine-grained workload balance and data reuse.

FIG. 6 illustrates a flowchart of a method 600 in accordance with some implementations of the subject matter as described herein. The method 600 may be implemented in the computing device 100 as shown in FIG. 1 or the architecture 200 as shown in FIG. 2. Alternatively, the method 600 may be implemented in any appropriate computing environment or architecture. The method 600 may be implemented by a general processing unit or dedicated hardware. The dedicated hardware may support a mixed precision arithmetic operation, and may include massive parallel processing units, such as GPUs or FPGAs.

At 602, an input feature map is quantized, to obtain a quantized input feature map. For example, the input feature map may be quantized in no more than 4 bits. For example, in a case that the method 600 is implemented by a general purpose processor, quantization may be executed by a vector processing unit of a general purpose processor. In some implementations, data format transformation between the vector processing unit and other kernels of the general purpose processor through an in-register shift.

At 604, based on the quantized input feature map, a sparsity mask for an output feature map, such as a binary sparsity mask, is determined through a quantized version of a convolutional neural network. The sparsity mask may indicate positions of non-zero entries in the output feature map. This may be implemented through a prediction module 240 as shown in FIG. 2. For example, the binary sparsity mask is encoded to record indices of non-zero entries only.

In some implementations, based on the quantized input feature map, a quantized output feature map is determined through a quantized convolution operation. The sparsity mask is determined based on the quantized output feature map.

In some implementations, based on the quantized input feature map, a quantized output feature map is determined through a quantized convolution and batch normalization operation, the convolution and batch normalization operation is fusion of a convolution operation and a batch normalization operation. The sparsity mask is determined based on the quantized output feature map.

In some implementations, the quantized output feature map is provided to an activation function, to determine an output of the activation function. The sparsity mask is determined based on a sign output by the activation function. The activation function may be ReLU or Max-pooling.

At 606, based on the input feature map, non-zero entries indicated by the sparsity mask in the output feature map is determined through a convolutional neural network. For example, based on the input feature map and the positions of the non-zero entries indicated by the sparsity mask, values of non-zero entries in the output feature map may be determined by computing through the convolutional neural network or in other manners.

In some implementations, the method 600 is implemented by a general purpose processor, and the quantization is performed through a vector processing unit of the general purpose processor.

In some implementations, data format transformation between the vector processing unit and other kernels of the general purpose processor is implemented through an in-register shift operation.

Some example implementations of the subject matter as described herein will be given below.

In a first aspect, there is provided a computer-implemented method. The method comprises quantizing an input feature map to obtain a quantized input feature map; determining, based on the quantized input feature map, a sparsity mask for an output feature map through a quantized version of a convolutional neural network, the sparsity mask indicating positions of non-zero entries in the output feature map; and determining, based on the input feature map, the non-zero entries indicated by the sparsity mask in the output feature map through the convolutional neural network.

In some implementations, quantizing the input feature map comprises: quantizing the input feature map in no more than 4 bits.

In some implementations, determining the sparsity mask comprises: determining, based on the quantized input feature map, a quantized output feature map through a quantized convolution operation; and determining, based on the quantized output feature map, the sparsity mask.

In some implementations, determining the sparsity mask comprises: determining, based on the quantized input feature map, a quantized output feature map through a quantized convolution and batch normalization operation, the convolution and batch normalization operation being fusion of a convolution operation and a batch normalization operation; and determining, based on the quantized output feature map, the sparsity mask.

In some implementations, determining, based on the quantized output feature map, the sparsity mask comprises: providing the quantized output feature map to an activation function, to determine an output of the activation function; and determining, based on a sign output by the activation function, the sparsity mask.

In some implementations, the sparsity mask is encoded to record indices of non-entries only.

In some implementations, the method is implemented by a general purpose processor, and wherein the quantizing is performed by a vector processing unit of the general purpose processor.

In some implementations, data format transformation between the vector processing unit and another kernel of the general purpose processor is implemented by an in-register shift operation.

In some implementations, the method is implemented by a hardware enabling a mixed precision arithmetic operation.

In a second aspect, there is provided a device. The device comprises a processing unit; and a memory coupled to the processing unit and having instructions stored thereon, the instructions, when executed by the processing unit, causing the device to perform acts comprising: quantizing an input feature map to obtain a quantized input feature map; determining, based on the quantized input feature map, a sparsity mask for an output feature map through a quantized version of a convolutional neural network, the sparsity mask indicating positions of non-zero entries in the output feature map; and determining, based on the input feature map, the non-zero entries indicated by the sparsity mask in the output feature map through the convolutional neural network.

In some implementations, quantizing the input feature map comprises: quantizing the input feature map in no more than 4 bits.

In some implementations, determining the sparsity mask comprises: determining, based on the quantized input feature map, a quantized output feature map through a quantized convolution operation; and determining, based on the quantized output feature map, the sparsity mask.

In some implementations, determining the sparsity mask comprises: determining, based on the quantized input feature map, a quantized output feature map through a quantized convolution and batch normalization operation, the convolution and batch normalization operation being fusion of a convolution operation and a batch normalization operation; and determining, based on the quantized output feature map, the sparsity mask.

In some implementations, determining, based on the quantized output feature map, the sparsity mask comprises: providing the quantized output feature map to an activation function, to determine an output of the activation function; and determining, based on a sign output by the activation function, the sparsity mask.

In some implementations, the sparsity mask is encoded to record indices of non-entries only.

In some implementations, the acts are implemented by a general purpose processor, and wherein the quantizing is performed by a vector processing unit of the general purpose processor.

In some implementations, data format transformation between the vector processing unit and another kernel of the general purpose processor is implemented by an in-register shift operation.

In some implementations, the acts are implemented by a hardware enabling a mixed precision arithmetic operation.

In a third aspect, the subject matter as described herein provides a computer program product stored in a non-transient computer storage medium and comprising computer-executable instructions, and the computer-executable instructions, when executed by a device, cause the device to perform the method in the first aspect of the subject matter as described herein.

In a fourth aspect, the subject matter as described herein provides a computer readable storage medium having computer-executable instructions stored thereon, and the computer-executable instructions, when executed by a device, cause the device to perform the method in the first aspect of the subject matter as described herein.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter as described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:

transforming an input into an input feature map via a convolutional neural network executing on a computer;

quantizing the input feature map to obtain a quantized input feature map;

determining, based on the quantized input feature map, a sparsity mask for an output feature map via a prediction module using a quantized version of the convolutional neural network and a quantized convolution layer, the sparsity mask indicating positions of non-zero entries in the output feature map;

determining, via a sparse convolution layer and based on the input feature map, the non-zero entries indicated by the sparsity mask in the output feature map via an activation function of the convolutional neural network; and providing a categorized result via the convolutional neural network in response to the input using the non-zero entries to perform convolutional neural network calculations and using zero entries of the output feature map to skip convolutional neural network calculations.

2. The method of claim 1, wherein quantizing the input feature map comprises:

quantizing the input feature map in no more than 4 bits.

3. The method of claim 1, wherein determining the sparsity mask comprises:

determining, based on the quantized input feature map, a quantized output feature map through a quantized convolution operation; and determining, based on the quantized output feature map, the sparsity mask.

4. The method of claim 1, wherein determining the sparsity mask comprises:

determining, based on the quantized input feature map, a quantized output feature map through a quantized convolution and batch normalization operation, the convolution and batch normalization operation being fusion of a convolution operation and a batch normalization operation; and determining, based on the quantized output feature map, the sparsity mask.

5. The method of claim 3, where determining, based on the quantized output feature map, the sparsity mask comprises:

providing the quantized output feature map to an activation function, to determine an output of the activation function; and determining, based on a sign output by the activation function, the sparsity mask.

6. The method of claim 1, wherein the sparsity mask is encoded to record indices of non-entries only.

7. The method of claim 1, wherein the method is implemented by a general purpose processor, and wherein the quantizing is performed by a vector processing unit of the general purpose processor.

8. The method of claim 7, wherein data format transformation between the vector processing unit and a kernel of the general purpose processor is implemented by an in-register shift operation.

9. The method of claim 1, wherein the method is implemented by a hardware enabling a mixed precision arithmetic operation.

10. A device, comprising:

a processing unit; and a memory coupled to the processing unit and having instructions stored thereon, the instructions, when executed by the processing unit, causing the device to perform acts comprising:

transforming an input into an input feature map via a convolutional neural network executing on a computer;

quantizing the input feature map to obtain a quantized input feature map;

determining, based on the quantized input feature map, a sparsity mask for an output feature map via a prediction module using a quantized version of the convolutional neural network and a quantized convolution layer, the sparsity mask indicating positions of non-zero entries in the output feature map;

determining, via a sparse convolution layer and based on the input feature map, the non-zero entries indicated by the sparsity mask in the output feature map via an activation function of the convolutional neural network; and providing a categorized result via the convolutional neural network in response to the input using the non-zero entries to perform convolutional neural network calculations and using zero entries of the output feature map to skip convolutional neural network calculations.

11. The device of claim 10, wherein quantizing the input feature map comprises:

quantizing the input feature map in no more than 4 bits.

12. The device of claim 10, wherein determining the sparsity mask comprises:

determining, based on the quantized input feature map, a quantized output feature map through a quantized convolution operation; and determining, based on the quantized output feature map, the sparsity mask.

13. The device of claim 10, wherein determining the sparsity mask comprises:

determining, based on the quantized input feature map, a quantized output feature map through a quantized convolution and batch normalization operation, the convolution and batch normalization operation being fusion of a convolution operation and a batch normalization operation; and determining, based on the quantized output feature map, the sparsity mask.

14. The device of claim 12, where determining, based on the quantized output feature map, the sparsity mask comprises:

providing the quantized output feature map to an activation function, to determine an output of the activation function; and determining, based on a sign output by the activation function, the sparsity mask.

15. A computer program product stored in a computer storage medium and comprising computer-executable instructions, the computer-executable instructions, when executed by a device, causing the device to perform acts comprising:

transforming an input into an input feature map via a convolutional neural network executing on a computer;

quantizing the input feature map to obtain a quantized input feature map;

determining, based on the quantized input feature map, a sparsity mask for an output feature map via a prediction module using a quantized version of the convolutional neural network and a quantized convolution layer, the sparsity mask indicating positions of non-zero entries in the output feature map;

determining, via a sparse convolution layer and based on the input feature map, the non-zero entries indicated by the sparsity mask in the output feature map via an activation function of the convolutional neural network; and providing a categorized result via the convolutional neural network in response to the input using the non-zero entries to perform convolutional neural network calculations and using zero entries of the output feature map to skip convolutional neural network calculations.

16. The computer program product of claim 15, wherein quantizing the input feature map comprises quantizing the input feature map in no more than 4 bits.

17. The computer program product of claim 15, wherein determining the sparsity mask comprises:

determining, based on the quantized input feature map, a quantized output feature map through a quantized convolution operation; and determining, based on the quantized output feature map, the sparsity mask.

18. The computer program product of claim 15, wherein determining the sparsity mask comprises:

determining, based on the quantized input feature map, a quantized output feature map through a quantized convolution and batch normalization operation, the convolution and batch normalization operation being fusion of a convolution operation and a batch normalization operation; and determining, based on the quantized output feature map, the sparsity mask.

19. The computer program product of claim 15, where determining, based on the quantized output feature map, the sparsity mask comprises:

providing the quantized output feature map to an activation function, to determine an output of the activation function; and determining, based on a sign output by the activation function, the sparsity mask.

20. The computer program product of claim 15, wherein the sparsity mask is encoded to record indices of non-entries only.

* * * * *